US005272000A

United States Patent [19]

Chenoweth et al.

[11] Patent Number: 5,272,000

[45] Date of Patent: Dec. 21, 1993

[54] NON-WOVEN FIBROUS PRODUCT CONTAINING NATURAL FIBERS

[75] Inventors: Vaughn C. Chenoweth, Coldwater; Roger C. Goodsell, Marshall, both of Mich.

[73] Assignee: Guardian Industries Corp., Northville, Mich.

[21] Appl. No.: 327,420

[22] Filed: Mar. 20, 1989

Related U.S. Application Data

[63] Continuation of Ser. No. 204,587, Jun. 9, 1988, abandoned, which is a continuation-in-part of Ser. No. 53,406, May 22, 1987, Pat. No. 4,751,134.

[51] Int. Cl.[5] ............ B32B 5/16

[52] U.S. Cl. ............ 428/283; 428/284; 428/288; 428/297

[58] Field of Search ............ 428/283, 284, 288, 297, 428/326, 902, 903, 286

[56] References Cited

U.S. PATENT DOCUMENTS

| | | | |
|---|---|---|---|
| 2,483,405 | 10/1949 | Prancis, Jr. | 154/54 |
| 2,689,199 | 9/1954 | Pesce | 154/46 |
| 2,695,855 | 11/1954 | Stephens | 154/54 |
| 4,237,180 | 12/1980 | Jaskowski | 428/280 |
| 4,302,499 | 11/1981 | Grisch | 428/285 |
| 4,358,502 | 11/1982 | Dunbar | 428/288 |
| 4,474,846 | 10/1984 | Doerer et al. | 428/284 |
| 4,524,040 | 6/1985 | Hergenrother | 428/288 |
| 4,529,644 | 7/1985 | Awano et al. | 428/288 |
| 4,547,421 | 10/1985 | Dunbar | 428/288 |
| 4,568,581 | 2/1986 | Peoples, Jr. | 428/35 |
| 4,574,108 | 3/1986 | Fakirov et al. | 428/288 |
| 4,612,238 | 9/1986 | DellaVecchia et al. | 428/228 |
| 4,637,951 | 1/1987 | Gill et al. | 428/215 |
| 4,643,940 | 2/1987 | Shaw et al. | 428/308 |
| 4,695,503 | 9/1987 | Liu et al. | 428/288 |
| 4,765,812 | 8/1988 | Homonoff et al. | 428/283 |
| 4,826,724 | 5/1989 | Bainbridge et al. | 428/289 |

*Primary Examiner*—James J. Bell

*Attorney, Agent, or Firm*—Willian Brinks Olds Hofer Gilson & Lione

[57] ABSTRACT

A non-woven matrix of glass fibers, synthetic and natural fibers provides a rigid but resilient product having good strength and insulating characteristics. The product may be utilized in a planar configuration or be further formed into complexly curved and shaped configurations. The matrix consists of glass fibers, synthetic fibers such as polyester, nylon or Kevlar and natural fibers of wood or textiles which have been intimately combined with a thermosetting resin into a homogeneous mixture. This mixture is dispersed to form a blanket. A variety of products having varying thickness and rigidity may then be produced by controlling the compressed thickness and the degree of activation of the thermosetting resin. The product may also include a skin or film on one or both faces thereof. An alternate embodiment includes a conductive/coloring agent such as carbon black.

12 Claims, 2 Drawing Sheets

NON-WOVEN FIBROUS PRODUCT CONTAINING NATURAL FIBERS

CROSS REFERENCE TO CO-PENDING APPLICATION

This application is a continuation of Ser. No. 204,587, filed Jun. 9, 1988, now abandoned, which is, in turn, a continuation-in-part application of Ser. No. 053,406, filed May 22, 1987, now U.S. Pat. No. 4,751,134, granted Jun. 14, 1988.

BACKGROUND OF THE INVENTION

The present invention relates to a non-woven fibrous product and more specifically to a non-woven blanket of mineral, man-made and natural fibers to which thermosetting resin may be added. The blanket may be formed into sheets, panels and complexly curved and configured products.

Non-woven fibrous products such as sheets and panels as well as other thin-wall products such as insulation and complexly curved and shaped panels formed from such planar products are known in the art.

In U.S. Pat. No. 2,483,405, two distinct types of fibers therein designated non-adhesive and potentially adhesive fibers are utilized to form a non-woven product. The potentially adhesive fibers typically consist of a thermoplastic material which are mixed with non-adhesive fibers to form a blanket, cord or other product such as a hat. The final product is formed by activating the potentially adhesive fibers through the application of heat, pressure or chemical solvents. Such activation binds the fibers together and forms a final product having substantially increased strength over the unactivated product.

U.S. Pat. No. 2,689,199 relates to non-woven porous, flexible fabrics prepared from masses of curled, entangled filaments. The filaments may be various materials such as thermoplastic polymers a-nd refractory fibers of glass, asbestos or steel. A fabric blanket consisting of curly, relatively short filaments is compressed and heat is applied to at least one side to coalesce the fibers into an imperforate film. Thus, a final product having an imperforate film on one or both faces may be provided or this product may be utilized to form multiple laminates. For example, an adhesive may be applied to the film surface of two layers of the product and a third layer of refractory fibers disposed between the film surfaces to form a laminate.

In U.S. Pat. No. 2,695,855, a felted fibrous structure into which is incorporated a rubber-like elastic material and a thermoplastic or thermosetting resin material is disclosed. The mat or felt includes carrier fibers of long knit staple cotton, rayon, nylon or glass fibers, filler fibers of cotton linter or nappers, natural or synthetic rubber and an appropriate resin. The resulting mat or felted structure of fibers intimately combined with the elastic material and resinous binder is used as a thermal or acoustical insulating material and for similar purposes.

U.S. Pat. No. 4,474,846 teaches the manufacture of a molded fibrous mat comprising cellulosic fibers preferably of wood, such as aspen, or paper, cotton, sisal, etc., carrier fibers of a thermoplastic material such as vinyl, polyester, nylon, polyvinyl chloride, etc. and a thermosetting resin. A suitable mix is defined as 85% by weight wood fibers, 10% polypropylene carrier fibers and 5% phenolic resin. After forming these ingredients into a mat, the carrier fibers may first be softened to give sufficient strength to the mat for subsequent handling. A secondary forming step may then be accomplished in which the thermosetting resin is activated to form a finished product.

U.S. Pat. No. 4,612,238 discloses and claims a composite laminated sheet consisting of a first layer of blended and extruded thermoplastic polymers, a particulate filler and short glass fibers, a similar, second layer of a synthetic thermoplastic polymer, particulate filler and short glass fibers and a reinforcing layer of a synthetic thermoplastic polymer, a long glass fiber mat and particulate filler. The first and second layers include an embossed surface having a plurality of projections which grip and retain the reinforcing layer to form a laminate.

It is apparent from the foregoing review of non-woven mats, blankets and felted structures that variations and improvements in such prior art products are not only possible but desirable.

SUMMARY OF THE INVENTION

The present invention relates to a non-woven blanket or mat consisting of a matrix of mineral, man-made, and natural fibers secured together by a thermosetting resin. The mineral fibers are preferably glass fibers and the man-made fibers may be polyester, rayon, acrylic, vinyl, nylon or similar synthetic fibers. The natural fibers are preferably wood, generally in the form of fibrous particles, but may also be any naturally occurring fiber.

The product consists essentially of fiberized glass fibers of three to ten microns in diameter. Such fibers, in an optimum blend, comprise 42% by weight of the resulting product. The synthetic fibers may be selected from a wide variety of materials such as polyesters, nylons, rayons, acrylics, vinyls and similar materials. Larger diameter and/or longer synthetic fibers typically provide more loft to the product whereas smaller diameter and/or shorter fibers produce a denser product. The optimum proportion of synthetic fibers is approximately 9% by weight. The natural fibers preferably woods such as fir, spruce and cedar or other naturally occurring fibers such as textile fibers may be utilized in a broad range of sizes. The optimum proportion of natural fibers is approximately 33% by weight.

A thermosetting resin is utilized to bond the fibers together. The thermosetting resin may be selectively activated to bond primarily only those fibers adjacent one or both faces of the blanket, partially activated throughout the blanket or completely activated throughout the blanket, if desired. The optimum proportion of the thermosetting resin is approximately 16% by weight. If desired, a foraminous or imperforate film or skin may be applied to one or both surfaces of the blanket during its manufacture to provide relatively smooth surfaces to the product.

In an alternate embodiment, conductive particles such as carbon black, may be incorporated within the fiber matrix. A darker colored product having an improved surface finish results.

The density of the product may also be adjusted by adjusting the thickness of the blanket which is initially formed and the degree to which this blanket is compressed during subsequent forming processes. Product densities in the range of from 1 to 50 pounds per cubic foot are possible.

It is therefore an object of the present invention to provide a non-woven matrix of glass, synthetic and natural fibers adhered together by a thermosetting resin.

It is a further object of the present invention to provide a non-woven matrix of glass, synthetic and natural fibers having a selected density and thickness.

It is a still further object of the present invention to provide a non-woven matrix of glass, synthetic and natural fibers wherein a thermosetting resin may be partially activated throughout the product.

It is a still further object of the present invention to provide a non-woven matrix of glass, synthetic and natural fibers having a skin or film on one or both surfaces and a thermosetting resin which may be partially activated.

It is a still further object of the present invention to provide a non-woven matrix of glass, synthetic and natural fibers and thermosetting resin which has its strength and rigidity adjusted by the degree of activation of the thermosetting resin.

It is a still further object of the present invention to provide a non-woven matrix of glass, synthetic and natural fibers having a thermosetting resin and conductive material dispersed throughout the fiber matrix.

Further objects and advantages of the present invention will become apparent by reference to the following description of the preferred embodiment and appended drawings.

DESCRIPTION OF THE PREFERRED EMBODIMENT

Figure 1:
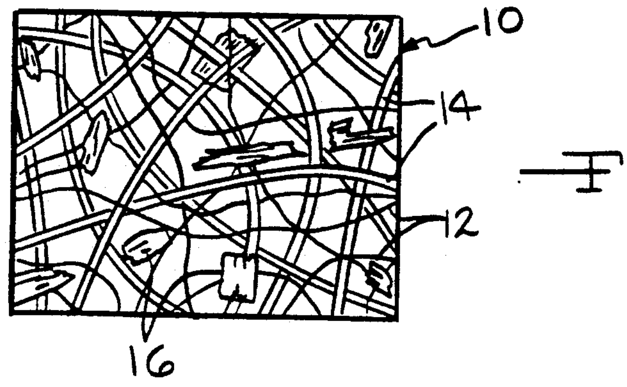
FIG. 1 is an enlarged, diagrammatic, plan view of a non-woven fiber matrix according to the present invention.

Referring now to FIG. 1, a non-woven fibrous blanket which comprises a matrix of mineral and man-made fibers according to the present invention is illustrated and generally designated by the reference numeral 10.

The non-woven fibrous blanket 10 comprises a plurality of first fibers 12 homogeneously blended with a plurality of second fibers 14 to form a generally interlinked matrix. A plurality of third fibers 16 or particles of fibers are dispersed uniformly throughout the first fibers 12 and second fibers 14.

The first fibers 12 are preferably mineral fibers, i.e., glass fibers. Preferably, such fibers 12 are substantially conventional virgin, rotary spun, fiberized glass fibers having a diameter in the range of from 3 to 10 microns. The fibers are utilized in a dry, i.e., non-resinated, condition. The length of the individual fibers 12 may vary widely over a range of from approximately one half inch or less to approximately 3 inches and depends upon the shredding and processing the fibers 12 undergo which is in turn dependent upon the desired characteristics of the final product as will be more fully described subsequently.

The second fibers 14 are man-made, i.e., synthetic, and may be selected from a broad range of appropriate materials. For example, polyesters, nylons, Kevlar or Nomex may be utilized. Kevlar and Nomex are trademarks for aramid fibers of the E. I. dupont Co. The second fibers 14 preferably define individual fiber lengths of from approximately one quarter inch to four inches. The loft/density of the blanket 10 may be adjusted by appropriate selection of the diameter and/or length of the second, synthetic fibers 14. Larger and/or longer fibers in the range of from 5 to 15 denier (approximately 25 to 40 microns) and one to four inches in length provide more loft to the blanket 10 and final product whereas smaller and/or shorter fibers in the range of from 1 to 5 denier (approximately 10 to 25 microns) and one quarter to one inch in length provide a final product having less loft and greater density. The second fibers 14 may likewise be either straight or crimped, straight fibers providing a final product having less loft and greater density and crimped fibers providing the opposite characteristics.

The third, natural fibers 16 are preferably wood or other naturally occurring fibers. If wood, they may be either hard or soft woods such as fir, spruce, hemlock, red cedar, oak, beech, white pine, red pine, balsa, sisal and the like. The term fibers in the expression natural fibers is used broadly with regard to wood inasmuch as the cellular structure (xylem) of the wood is fibrous but, depending upon the wood treatment process, that is, sawing, chipping, grinding, abrading, etc., utilized to produce them, they may be in the form of fibers, particles, flour, dust, powder, etc. The fiber or particle size may thus vary widely, both from the standpoint of suitable (usable) particle size and variation of particle size within a given batch or sample. For purposes of example and illustration the fiber and/or particle size may vary from the low (10–50) micron range to the several (2–5) millimeter range. The size of the third, natural fibers 16, or particles of fibers, also affects the density/loft of the final product; coarser (larger) fibers or particles providing greater loft (less density) and finer fibers or particles providing increased density and less loft. Preferably, the moisture content of the wood fibers is held to between about 5% and 15% by weight and ideally is about 12%.

The natural fibers 16 may also be textile fibers such as cotton, flax, wool and the like. Such textile fibers are utilized in lengths of from about 0.125 inches to about 1.5 inches.

The first, glass fibers 12, the second, synthetic fibers 14 and third, natural fibers 16 are shredded and blended sufficiently to produce a highly homogeneous mixture of the three fibers. A mat or blanket 10 having a uniform thickness is then formed and the product appears as illustrated in FIG. 1. Typically, the blanket will have an initial thickness of between about 1 and 3 inches although a thinner or thicker blanket 10 may be produced if desired.

Figure 2:
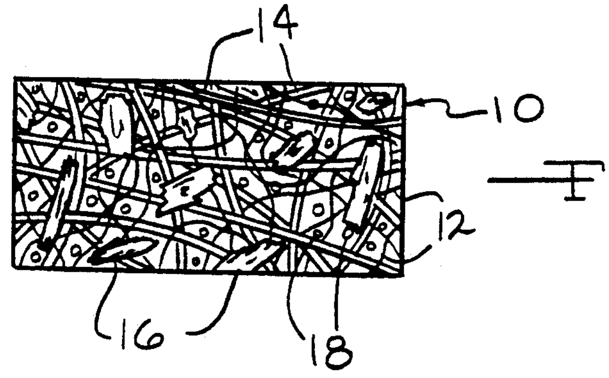
FIG. 2 is an enlarged, diagrammatic, side elevational view of a non-woven fiber matrix according to the present invention with unactivated thermosetting resin.

Referring now to FIG. 2, the blanket 10 also includes particles of a thermosetting resin 18 dispersed uniformly throughout the matrix comprising the first, glass fibers 12, the second, synthetic fibers 14 and the third, natural fibers 16. The thermosetting resin 18 may be one of a broad range of general purpose, engineering or specialty thermosetting resins such as phenolics, aminos, epoxies and polyesters. The thermosetting resin 18 functions as a heat activatable adhesive to bond the fibers 12, 14 and 16 together at their points of contact thereby providing structural integrity, and rigidity as well as a desired degree of resiliency and flexibility as will be more fully described below. The quantity of thermosetting resin 18 in the blanket 10 directly affects the maximum obtainable rigidity and density. Partial activation of the resin may be utilized to achieve a proportional degree of such maximum rigidity and density.

The control of rigidity and density in this manner is a feature of the present invention and the choice of thermosetting resins 18 is another parameter affecting such characteristics. For example, shorter flowing thermosetting resins such as epoxy modified phenolic resins which, upon the application of heat, quickly liquefy, generally rapidly bond the fibers 12, 14 and 16 together throughout the thickness of the blanket 10. Conversely, longer flowing, unmodified phenolic resins liquefy more slowly and facilitate differential curing of the resin through the thickness of the blanket 10 as will be described more fully below.

The following Table I delineates various ranges as well as an optimal mixture of the three fibers 12, 14 and 16 and the thermosetting resin 18 discussed above. The table sets forth weight percentages.

TABLE I

| | Functional | Preferred | Optimal |
|---|---|---|---|
| Glass Fibers (12) | 20-70 | 30-55 | 42 |
| Synthetic Fibers (14) | 2-30 | 5-15 | 9 |
| Natural Fibers (16) | 5-80 | 20-50 | 33 |
| Thermosetting Resin (18) | 5-35 | 10-25 | 16 |

Figure 3:
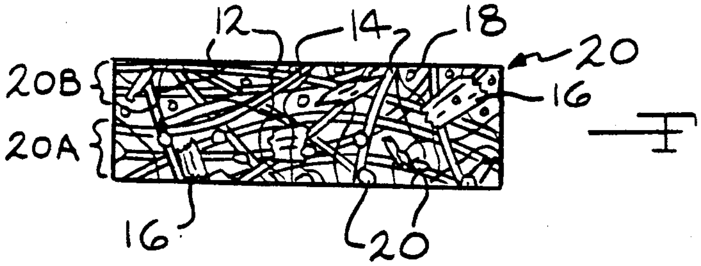
FIG. 3 is an enlarged, diagrammatic, side elevational view of a non-woven fiber matrix product according to the present invention in which the thermosetting resin is partially differentially activated.

Referring now to FIG. 3, one manner and result of partial activation of the thermosetting resin 18 is illustrated. Here differential activation, that is, activation of the thermosetting resin 18 in relation to the distance from one face of the blanket 10 will be described. As noted, one of the features of the present invention is the adjustability of the rigidity, density and thickness of a product 20 to either match the requirements of a given application or meet, i.e., anticipate, those of secondary processing associated with the production of modified, final products.

In FIG. 3, the product 20 includes the first glass fibers 12, the second, synthetic fibers 14 and the third, natural fibers 16 which have been bonded together in the lower portion 20A of the product 20 by activation of the thermosetting resin 18, as illustrated by the bonded junctions 22. In contrast to the lower portion 20A, is the upper portion 20B of the product 20, wherein the thermosetting resin 18 has not been activated. Such partial differential activation of the thermosetting resin 18 is accomplished by the application of heat, radio frequency energy or other appropriate resin related activating means such as a chemical solvent only to the lower surface 24 of the product 20.

The resulting product exhibits substantially maximum obtainable rigidity and strength in one portion (20A) of its thickness and minimum rigidity and strength in the remaining portion (20B) of its thickness. Thus the lower, activated portion 20A serves as a substrate of controlled rigidity which lends structural integrity to the product and facilitates intermediate handling prior to secondary forming of the product into a final product having fully activated thermosetting resin 18 and concomitant increased structural integrity. It will be appreciated that the relative thicknesses of the initially activated portion 20A and unactivated portion 20B of the blanket 10 may be varied in a complementary fashion from virtually nothing to the full thickness of the blanket 10, as desired.

Figure 4:
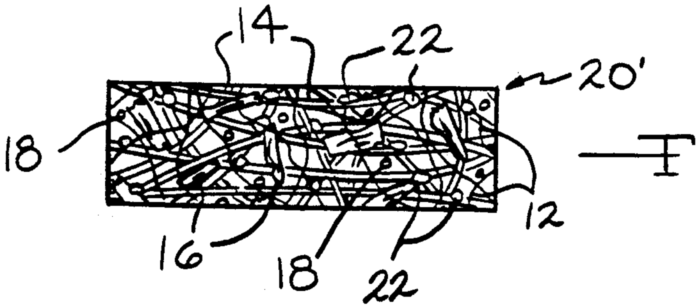
FIG. 4 is an enlarged, diagrammatic, side elevational view of a non-woven fiber matrix product according to the present invention in which the thermosetting resin is partially homogeneously activated.

Referring now to FIG. 4, a second manner and result of partial activation of the thermosetting resin 18 is illustrated. In this product 20', partial homogeneous activation, that is, partial activation of the thermosetting resin 18 throughout the blanket 10 is achieved. The product 20' likewise includes first, glass fibers 12, second, synthetic fibers 14 and third, natural fibers 16 which have been partially bonded together by substantially uniform, though partial, activation of the thermosetting resin 18 throughout the blanket 10. Such partial, homogeneous activation is preferably and more readily accomplished with longer flowing resins and careful control of heat or other resin activating agents. The portion of the thermosetting resin 18 initially activated in this manner may be varied as desired. The portion of the thermosetting resin 18 activated will be determined by considerations of required or permitted structural integrity of the product 20', for example.

The products 20 and 20' exhibit several unique characteristics. First of all, their strength and rigidity are related to the strength and rigidity of a fully cured (thermosetting resin fully activated) product in direct proportion to the percentage of activated thermosetting resin 18. Thus, a desired rigidity may be achieved by selective application of heat or other means to activate a desired proportion of the thermosetting resin 18 to provide a desired proportion of bonded junctions 22 within the product 20 or 20'. Secondly, both the products 20 and 20' facilitate secondary processing and final forming into complexly curved and shaped panels and other similar products. That is, the activated thermosetting resin 18 and junctions 22 provide interim, minimal strength whereas the unactivated regions are still flexible, thereby not rendering the products 20 and 20' overly rigid and creating difficulties with inserting the products 20 and 20' into a final mold while still providing necessary material and bulk for the final product. For example, automobile headliners and other sound and heat insulating complexly shaped panels may be readily formed from the product 20 or 20'.

Figure 5:
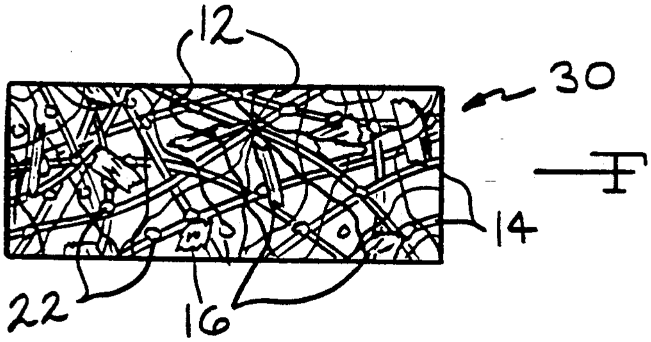
FIG. 5 is an enlarged, diagrammatic, side elevational view of a non-woven fiber matrix product according to the present invention in which the matrix is significantly compressed and the thermosetting resin is fully activated.

Referring now to FIG. 5, a product 30 including the first, glass fibers 12, second, synthetic fibers 14 and third, natural fibers 16 is illustrated. Here, all of the thermosetting resin 18 has been activated by heat or other suitable agents. Thus, the bonded junctions 22 appear throughout the thickness of the product 30. Since the thermosetting resin 18 is fully activated in the product 30 illustrated in FIG. 5, it is generally considered that it is finished and will be utilized in this form. The product 30 typically will be planar and could be utilized as a sound absorbing panel in thicknesses from one sixteenth to one and one half inches for acoustical treatment of living spaces or other similar heat or sound insulating or absorbing functions. The incorporation of the natural fibers 18, especially wood fibers or particles, has been found particularly advantageous from a sound absorbing and deadening standpoint.

It should be understood that when the product 20 illustrated in FIG. 3 or the product 20′ in FIG. 4 are subsequently processed by heat, molding and other appropriate steps to fully activate the previously unactivated portion of the thermosetting resin 18, they will appear substantially the same as or identical to the product 30 illustrated in FIG. 5.

Figure 6:
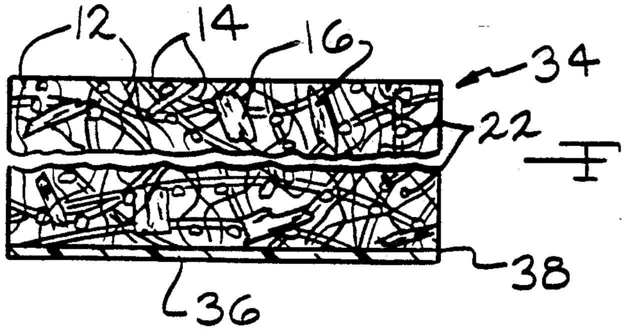
FIG. 6 is an enlarged, diagrammatic, side elevational view of a non-woven fiber matrix product according to the present invention including a film disposed on one surface thereof.

Another variant of the product according to the present invention is illustrated in FIG. 6. Here, a product 34 including the first, glass fibers 12, the second, synthetic fibers 14, the third, natural fibers 16 and the thermosetting resin 18 further includes a thin skin or film 36. Preferably, though not necessarily, the film 36 is adhered to one surface of the product 34 by a suitable adhesive layer 38. The film 36 preferably has a thickness of from about 2 to 10 mils and may be any suitable thin layer such as spunbonded polyester, spunbonded nylon as well as a scrim, fabric or mesh material of such substances. The skin or film 36 may be either foraminous or imperforate as desired. The prime characteristics of the film 36 are that it provides both a supporting substrate and a relatively smooth face for the product 34, which is particularly advantageous if it undergoes primary and secondary activation of the thermosetting resin 18 as discussed above with regard to FIG. 3. It is desirable that the skin or film 36 not melt or become unstable when subjected to the activation temperatures or chemical solvents associated with the thermosetting resin 18. It should be well understood that the skin or film 36, though illustrated in a product 34 having fully activated thermosetting resin 18, is suitable, appropriate and desirable for use with a product such as the products 20 and 20′ illustrated in FIGS. 3 and 4 which are intended to and undergo primary and secondary processing and activation of the thermosetting resin 18 as described.

Figure 7:
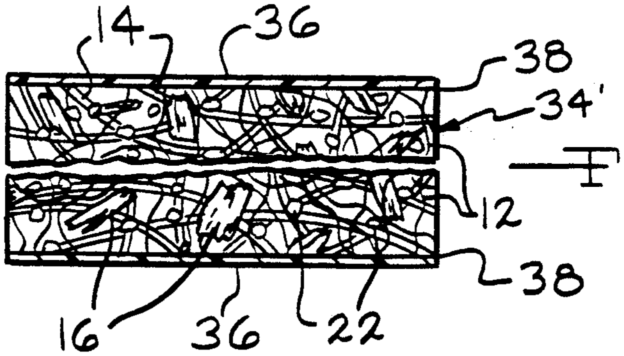
FIG. 7 is an enlarged, diagrammatic, side elevational view of a non-woven fiber matrix product according to the present invention including a film-disposed on both surfaces thereof.

With reference now to FIG. 7, another product 34′ is illustrated. Here, a non-woven matrix of the first, glass fibers 12, the second, synthetic fibers 14, the third natural fibers 16 and the thermosetting resin 18 is covered on both faces with thin skins or films 36. The films 36 are identical to those described directly above with regard to FIG. 6. Adhesive layers 38 may be utilized to ensure a bond between the fiber matrix, as also described above. Again, it should be understood that the product 34′ having two surface films 36, is intended to be and is fully suitable and appropriate for partial differential or partial homogeneous activation of the thermosetting resin 18, as described above with reference to FIGS. 3 and 4, respectively.

Figure 8:
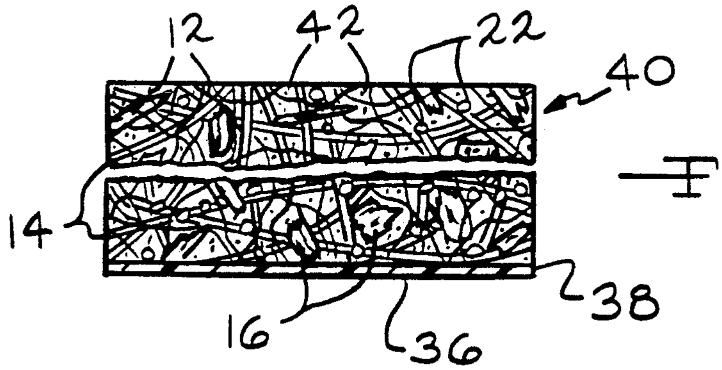
FIG. 8 is an enlarged diagrammatic, side elevational view of a non-woven fiber matrix product according to the present invention having a conductive material dispersed throughout the fiber matrix.

Referring now to FIG. 8, a first alternate embodiment 40 of the product 20 and variants 20′, 34 and 34′, described above, is illustrated. The alternate embodiment product 40 includes the first, glass fibers 12, the second, synthetic fibers 14, the third, natural fibers 16, the thermosetting resin 18 and particles of a conductive material 42. The particles of conductive material 42 may be powdered aluminum or copper or carbon black. Other finely divided or powdered conductive materials, primarily metals, are also suitable. The carbon black may be like or similar to Vulcan P or Vulcan XC-72 fluffy carbon black manufactured by the Cabot Corporation. Vulcan is a trademark of the Cabot Corporation. Pelletized carbon black may also be utilized but must, of course, be pulverized before its application to the blanket 10 for mixing with the thermosetting resin 18 and application to the blanket 10.

The particles of conductive material 42, if they are carbon black, change the appearance of the product 20, illustrated in FIG. 3, from its natural tan to light brown color (depending upon the content and type of natural fibers 16) through gray to silvery black and black, depending upon the relative amount of carbon black added to the alternate embodiment product 40. This color shading and particularly the choice of the degree of shading is advantageous in many product applications where the product 40 must be inobtrusive and/or blend with dark surroundings.

The incorporation of particles of conductive material 42 into the product 40 also improves the surface uniformity and thus the appearance of the product 40. This is apparently the result of the draining off or dissipating of static electrical charges generated during the mixing and formulation of the blanket 10. Further details regarding the conductive material 42 may be found in copending U.S. patent application Ser. No. 195,262, filed May 18, 1988, now abandoned, which is hereby incorporated by reference.

The activation of the thermosetting resin 18, as generally illustrated in FIGS. 3, 4, 5 and 6 is preferably accomplished by heat inasmuch as partial activation of the thermosetting resin 18 is more readily and simply accomplished thereby. However, as noted, activation means such as radio frequency energy, chemical solvents and the like corresponding to various types of thermosetting resins 18 are suitable and within the scope of the present invention. With regard to temperature activation of the thermosetting resins, fast curing resins typically are activated at relatively high temperatures of about 300–400° Fahrenheit and above. In situations where partial activation of the thermosetting resin is desired such as that illustrated in FIGS. 3 and 4, slower curing, unmodified phenolic resins typically require temperatures of between about 200° and 300° Fahrenheit applied to one or both faces of the products 20 and 20′, as desired.

In summation, it will be appreciated that the present invention provides a non-woven fibrous product consisting of a matrix of glass, synthetic and natural fibers having a thermosetting resin dispersed therethrough. One surface of the product may include and be defined by a film such as a foraminous or imperforate film or plastic mesh or fabric. In a product which either includes or excludes the film, the thermosetting resin may be partially activated through the thickness of the product to provide in a initial product having minimal rigidity and structural integrity but which is not so rigid as to inhibit placement and subsequent final forming in a complexly curved mold. During the final forming, the remainder of the thermosetting resin is activated and the product takes on increased rigidity. The proportion of thermosetting resin initially activated may be varied as desired. Furthermore, the thermosetting resin in surface adjacent regions of both faces of the product may be activated by the appropriate activation means (heat, solvents, etc.) to render a medial section unactivated, if desired.

The product in its final form, which will typically include fully activated thermosetting resin as illustrated in FIGS. 5, 6, 7 and 8, though relatively rigid, exhibits sufficient resiliency and flexibility that it may be relatively sharply bent without damaging the fiber matrix. The product will thus return undamaged to its original position and condition. This feature is a function of the interlinked fiber matrix and the flexibility provided primarily by the synthetic fibers. Flexibility of the final product is increased by increasing the proportion of a synthetic fibers and increasing the length of the synthetic fibers as well. On the other hand, the rigidity of the final product is increased by increasing the proportion of the thermosetting resin, the proportion of glass fibers and compressing the final product to have relatively high density. The density of the final product may be adjusted by such means to between 1 and 50 pounds per cubic foot.

The incorporation of natural fibers, particularly fibrous particles of wood of widely varying size, provides improved sound absorbing and deadening characteristics. This is presumed to be the result of their energy absorbing cellular structure. Depending upon the size of the natural fibers and fibrous particles the surface finish of the product will be improved as these materials fill the interstices in the fiber matrix. Surface finish may also be improved, as noted, by the inclusion of particles of a conductive material such as carbon black.

The foregoing disclosure is the best mode devised by the inventors for practicing this invention. It is apparent, however, that products incorporating modifications and variations will be obvious to one skilled in the art of fiber matrix products. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

We claim:

1. A non-woven fibrous molding media comprising, in combination, a matrix of non-resinated glass fibers and synthetic fibers selected from the group of polyester, nylon, or aramid fibers, said glass fibers having a diameter of at least 3 microns but smaller than the diameter of said synthetic fibers and constituting between 30 and 55 weight percent of said molding media, and natural fibers selected from the group of wood or textile fibers and a thermosetting resin dispersed throughout said matrix.

2. The non-woven fibrous molding media of claim 1 further including a plastic layer secured to at least one face of said matrix of fibers.

3. The non-woven fibrous molding media of claim 1 wherein said natural fibers are selected from the group consisting of fir, spruce, hemlock, red cedar, oak, beech, white pine, rid pine, balsa and sisal.

4. The non-woven fibrous molding media of claim 1 wherein said thermosetting resin has been at least partially activated.

5. The non-woven fibrous molding media of claim 1 further including particles of conductive material dispersed throughout said matrix.

6. The non-woven fibrous molding media of claim 1 wherein said glass fibers have a diameter of between 3 and 10 microns and a length of between approximately one half and three inches and said synthetic fibers have a diameter from larger than 10 microns to 40 microns and a length of between approximately 0.25 to 4 inches.

7. The non-woven fibrous molding media of claim 1 wherein said glass fibers constitute between 30 and 55 weight percent of said product, said synthetic fiber constitute between 5 and 15 weight percent of said product, said natural fibers constitute between 20 and 50 weight percent of said product and said thermosetting resin constitutes between 10 and 25 weight percent of said product.

8. The non-woven fibrous molding media of claim 1 wherein said natural fibers are fibrous wood fibers, particles, flour, dust, or powder and constitute between 5 and 80 weight percent of said product.

9. A non-woven fibrous product comprising, in combination, a blended matrix of glass fibers having a diameter of at least 3 microns and synthetic fibers selected from the group consisting of polyester, nylon, and aramid fibers, wood fibers and a thermosetting resin dispersed throughout said matrix wherein at least a portion of said thermosetting resin has been activated, said glass fibers constitute between 30 and 55 weight percent of said product, said synthetic fibers constitute between 5 and 15 weight percent of said product, said wood fibers constitute between 5 and 80 20 and 50 weight percent of said product, and said thermosetting resin constitutes between 20 and 25 weight percent of said product.

10. The non-woven fibrous product of claim 9 further including particles of a conductive material dispersed throughout said product.

11. The non-woven fibrous product of claim 9 wherein said glass fibers constitute about 42 weight percent of said product, said synthetic fibers constitute about 9 weight percent of said product, said wood fibers constitute about 33 weight percent of said product and said thermosetting resin constitutes about 16 weight percent of said product.

12. The non-woven fibrous product of claim 9 further including a film secured to at least one face of said matrix of fibers.

* * * * *